United States Patent [19]
Habermann et al.

[11] Patent Number: 4,696,749
[45] Date of Patent: Sep. 29, 1987

[54] OXIDATIVE TREATMENT OF WASTEWATERS

[75] Inventors: Wolfgang Habermann, Mainz; Peter Hammes, Ruppertsberg; Hubert Engelhardt, Ludwigshafen; Wolfgang Geiger, Plankstadt; Walter Haltrich, Edingen-Neckarhausen; Werner Simmler, Ludwigshafen, all of Fed. Rep. of Germany

[73] Assignee: BASF Aktiengesellschaft, Ludwigshafen, Fed. Rep. of Germany

[21] Appl. No.: 764,326

[22] Filed: Aug. 12, 1985

[30] Foreign Application Priority Data

Aug. 18, 1984 [DE] Fed. Rep. of Germany ....... 3430484

[51] Int. Cl.[4] ................................................ C02F 1/72
[52] U.S. Cl. .................................. 210/721; 210/759; 210/763

[58] Field of Search ............... 210/721, 759, 762, 763, 210/663, 668, 694; 502/182, 305, 353

[56] References Cited

U.S. PATENT DOCUMENTS 3,029,201 4/1962 Brown et al. ....................... 210/763

FOREIGN PATENT DOCUMENTS 54-127150 10/1979 Japan .................................. 210/763

*Primary Examiner*—Ivars Cintins
*Attorney, Agent, or Firm*—Keil & Weinkauf

[57] ABSTRACT

Wastewaters are subjected to an oxidative treatment with a carbon-containing catalyst and an oxidizing agent by a process in which the carbon carrier used, e.g. graphite, coke or active carbon, is subjected to anodic oxidation in an aqueous mineral acid and then doped with molybdenum(VI) and/or tungsten(VI) and/or vanadium(V) compounds.

16 Claims, No Drawings

OXIDATIVE TREATMENT OF WASTEWATERS

In industry, the oxidative treatment of wastewater is carried out using activated carbons which make it possible to bind the harmful substances and the oxygen in fairly high concentration on the surface of the carbon so that biodegradation and chemical decomposition are accelerated. Compared with water, these carbons absorb about 800 times the amount of oxygen, some of the oxygen being bonded chemisorptively and reacting by a two-electron step (Berl mechanism), in accordance with the equation

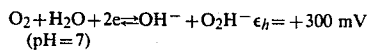

$$O_2+H_2O+2e \rightleftharpoons OH^- + O_2H^- \quad \epsilon_h=+300 \text{ mV (pH}=7)$$

In this process, chemical or biological oxidation takes place at the polarized carbon particles or via the hydrogen peroxide reaction product produced during the reduction of the oxygen. The active carbons are produced industrially by partially oxidation of coal with steam, oxygen, alkali metal salts, alkali metal hydroxides and the like at elevated temperatures, or by carbonization of cärbonaceous materials with zinc chloride, iron chloride, phosphoric acid or other dehydrating substances or by ignition of active carbon in an inert atmosphere, eg. nitrogen or hydrogen, or under reduced pressure.

All the methods stated give activated carbons which permit reduction of oxygen only by the Berl mechanism.

Other chemical oxidative pretreatments too, for example those with nitric acid, sulfuric acid, oleum, or a nitric acid/sulfuric acid, nitric acid/hydrogen peroxide, sulfuric acid/hydrogen peroxide, sulfuric acid peroxydisulfuric acid, sulfuric acid/chromic acid mixture at $<+120°$ C. and with nitrogen dioxide at $+300°$ C., do not result in any substantial improvement in the catalytic activity.

The disadvantage of an oxidative treatment of wastewater using the stated oxidation catalysts is that, at the potentials of the Berl mechanism, a number of harmful organic substances, eg. humic acids, fulvic acids, aromatics or chlorohydrocarbons, can be oxidatively degraded only with difficulty if at all.

It is an object of the present invention to provide a process which permits the reduction of oxygen to be carried out substantially by a four-electron step in accordance with the equation

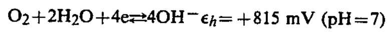

$$O_2+2H_2O+4e \rightleftharpoons 4OH^- \quad \epsilon_h=+815 \text{ mV (pH}=7)$$

and hence permits the harmful substances to be easily degraded oxidatively at higher potentials.

We have found that the oxidative treatment of wastewaters with a carbon-containing catalyst and an oxidizing agent can be carried out at a higher potential if the carbon carrier used is subjected to anodic oxidation in an aqueous mineral acid at a potential $\epsilon_h$ of from $+1.3$ to $+10$ V and then doped with molybdenum(VI) and/or tungsten(VI) and/or vanadium(V) compounds.

Examples of suitable carbon carriers are graphite, coke, active carbon intermediates, active carbon or anthracite, preferably graphite and active carbon intermediates.

The anodic oxidation of the carbon carrier is effected in an aqueous mineral acid, eg. nitric acid, phosphoric acid, sulfuric acid or perchloric acid, at a potential $\epsilon_h$ of from $+1.3$ to $+10$ V, preferably from $+1.8$ to $+2.5$ V.

An aqueous 2–80, preferably 30–65, % strength by weight nitric acid is particularly suitable. The anodic oxidation is advantageously carried out at from $-2°$ to $+100°$ C., preferably from $+10°$ to $+50°$ C., using a current density of from 0.1 to 10 $kA/m^2$. The most advantageous current density for the anodic oxidation is from 0.5 to 4 $kA/m^2$ of outer carbon surface.

The oxidation time can be from 2 seconds to 2 hours, preferably from 5 to 30 minutes. The amount of oxygen bound to the carbon surface after the anodic oxidation should be about 30 atom percent.

The partially oxidized carbon carrier can be doped and impregnated using dissolved or finely dispersed compounds of molybdenum, tungsten, or vanadium.

Examples of suitable molybdenum compounds are ammonium dimolybdate, ammonium heptamolybdate, ammonium decamolybdate, sodium molybdate, potassium molybdate, molybdenum tetrachloride and molybdenum oxytetrachloride, examples of suitable tungsten compounds are sodium tungstate, potassium tungstate, tungsten hexachloride and tungsten oxytetrachloride, and examples of suitable vanadium compounds are sodium vanadate, potassium vanadate, alkali metal divanadates and tetravanadates, sodium ammonium vanadate and vanadium oxytrichloride.

Preferaby, the partially oxidized carbon carrier is doped using an alkali metal molybdate or vanadate. Where a vanadium compound is used, care must be taken to ensure good fixing to the oxidized surface of the carbon carrier so that no vanadium passes into the waste water. Hence, vanadium compounds are preferably fixed by conversion to iron, titanium or zirconium vanadates.

In addition to the molybdenum and/or tungsten(VI) and/or vanadium(V) compounds, the carbon carriers may furthermore be doped with oxides, oxide hydroxides or hydroxides of titanium, zirconium, iron, nickel, cobalt or manganese. Compounds of this type can subsequently be used, in the wastewater, to improve the immobilization of microorganisms or enzymes and the adsorption of the harmful substances onto the catalyst surfaces.

For the doping procedure, th molybdenum, tungsten or vanadium compounds or other additives are dissolved or dispersed in water, an alcohol, eg. methanol or ethanol, an ether, eg. methyl ethyl ether or a chlorohydrocarbon, eg. chloroform or carbon tetrachloride.

Water is preferably used as the solvent. The concentration of the tungsten, molybdenum or vanadium compounds in the solvent can be from 0.01% by weight to the saturation limit, preferably from 0.3 to 5% by weight.

After impregnation with the dopants, the carbon carrier can be dried in order to promote fixing, halides being hydrolyzed beforehand. The actual fixing is effected with a dilute aqueous mineral acid or an acidic alkali metal salt, preferably from 0.2 to 4% strength by weight aqueous nitric acid or sulfuric acid or alkali metal sulfate solution of pH 0.5–1.5 being employed. Good fixing is achieved where fixing is carried out at from $+15°$ to $+30°$ C. during a residence time of from 0.1 to 3 hours.

Fixing may be followed by additional doping and partial reduction of the molybdenum(VI), tungsten(VI) and/or vanadium(V) compounds with a sulfide or hydrogen sulfide. This is preferably done using an aqueous ammonium sulfide or alkali metal sulfide solution, eg. sodium sulfide or potassium sulfide. The concentration of these solutions can be from 0.1 to 10, preferably from 1 to 6, % by weight of alkali metal sulfide. To effect doping, the catalyst material is immersed for a few minutes, preferably from 1 to 8 minutes, in the alkali metal or ammonium sulfide solution and then separated off and freed from the excess sulfide with a dilute aqueous mineral acid.

Instead of sulfides it is also possible to carry out partial reduction using other reducing agents, eg. hydrazine hydrate, hydroxylamine, hydroquinone or hydrogen, or by means of cathodic reduction.

Following the anodic oxidation of the carbon carrier, a particularly suitable method of activation and fixing has proved to be doping by means of molybdenum(VI) or vanadium(V) compounds and iron(III) and/or zirconium (III) or (V) and/or titanium(III) or (IV) and/or iodine (VII) and/or iodine(V) and/or tellurium(VI) compounds. In the case of activation with molybdenum, the atomic ratio of molybdenum to iron should be from 1:1 to 3:2 and that of molybdenum to iodine and of molybdenum to tellurium should each be 6:1. In the mixtures, the amounts should be adapted to the ratios. In the case of activation with vanadium, an atomic ratio of vanadium to titanium and/or zirconium of from 1:1 to 2:1 has proven advantageous.

Preferably used iron(III) compounds are iron(III) nitrate, iron(III) chloride and iron(III) sulfate. Iodine is preferably used in the form of the alkali metal iodates or periodates, whereas tellurium is preferably employed as an alkali metal tellurite. Titanium and zironcium are preferably used in the form of the halides or oxysulfates.

Instead of tellurium compounds, it is also possible to use selenium compounds. For toxicological reasons, these compounds are generally not used.

The oxidizing agent preferably used for converting the harmful substances in the wastwater is oxygen or air. In special cases, for harmful substances which are difficult to oxidize it is, however, also possible to use other oxidizing agents, eg. hydrogen peroxide, peroxydisulfates, perborates, chlorates, chlorites, chlorine dioxide, ozone, nitric acid, nitrous gases, nitrogen dioxide, iron(III) salts, iron(III) salt/hydrogen peroxide mixtures, nitric acid/hydrogen peroxide mixtures or nitric acid/hydrogen peroxide/iron(III) salt mixtures.

Iron (III) nitrate/hydrogen peroxide mixtures are preferably used, these having a particularly good oxidizing action in the degradation of chlorohydrocarbons when carbon carriers doped with molybdenum and/or vanadium are used.

To increase the concentration of harmful substances of the catalyst surface and hence to improve the oxidation of these substances, anionic and/or cationic polyelectrolytes are absorbed onto the carbon carrier, or a mixture of the two types of particles is used.

Suitable polyelectrolytes are non-oxidizable inorganic anion and cation exchangers, eg. titanium oxide hydroxide, zirconium oxide hydroxide, kaolinite, montmorillonite, apatite, synthetic hydroxylapatite, magnesium oxide hydroxide, aluminum oxide hydroxide, aluminum titanium oxide hydroxide or aluminum zirconium oxide hydroxide, and organic anion and cation exchangers, eg. polymers or copolymers of styrene, styrene and divinylbenzene, styrene and maleic anhydride, acrylates and divinylbenzene, methacrylates and divinylbenzene, olefins, perfluorinated olefins, and vinyl chloride, which contain, as charge-carrying groups, sulfo and/or carboxyl and/or quaternary ammonium and/or primary, secondary or tertiary amino groups.

Synthetic hydroxylapatite, aluminum titanium oxide hydroxide, aluminum zirconium oxide hydroxide, zirconium oxide hydroxide and titanium oxide hydroxide are preferred.

To carry out the procedure industrially, the doped carbon carrier, in the form of granules, is placed in filter beds through which the water containing harmful substances and saturated with oxygen flows from above. These filter beds can be operated so that the spaces between the granules are flooded with liquid (wet procedure) or still contain gas, eg. air or oxygen, as in, for example, the trickle-bed method (dry procedure). To increase the oxygen concentration in the water, the procedure can be carried out under superatmospheric pressure. The material should have a uniform particle size, particle sizes of from 2 to 6 mm being preferred.

Instead of the filter beds flowed through from above, it is also possible to use beds which are flowed through from below. Depending on the flow velocity, such beds can be operated as expanded beds or fluidized beds, and air or oxygen may additionally be introduced. In this case, it is possible to use more finely divided granules, eg. from 0.5 to 2 mm. It is also possible to coat immersed or suspended bodies with the catalyst.

The doped carbon carriers may furthermore be in the form of porous tubes or sheets which are activated and doped on one side, the wastewater flowing past on the active side while air or oxygen is forced through the carbon carrier from the other side, which may be rendered water-repellent.

It is also possible to activate and dope graphite felt or carbon felt on the surface, the oxygen-containing wastewater flowing through the said felt.

Where oxidizing agents other than oxygen are used, eg. hydrogen peroxide, iron(III) nitrate/hydrogen peroxide mixtures and the like, it is advantageous to use filter beds through which the wastewater flows.

EXAMPLE 1

Active carbon granules having a length of 5 mm and a diameter of 3 mm are anodically oxidized in 50% strength by weight aqueous nitric acid for 8 minutes at a current density of ~6 kA/m$^2$ and a potential $\epsilon_h$ of 2.2 V. The granules are then washed with water, impregnated with 5% strength by weight sodium molybdate solution and dried for 3 hours at +80° C. Thereafter, the impregnated carbon is moistened with 5% strength by weight aqueous iron(III) nitrate solution at pH 1 and then washed with water, after which the catalyst is moistened with 0.2% strength hydrazine hydrate solution for one or two minutes, washed again with water and immersed in 5% strength aqueous sulfuric acid.

Where the catalyst is used in 5% strength aqueous sulfuric acid and the mixture is gassed with oxygen, the resulting equilibrium potential $\epsilon_h$ is 1080 mV. The maximum exchange current density on gassing with oxygen and cathodic polarization is >10 kA/m$^2$ of geometrical surface area of the granules at a potential $\epsilon_h$ of 0 mV. In comparison, the untreated carbon and the carbon which has been only anodically preoxidized but not doped are characterized by the following data under the same conditions:

| Active carbon Treatment | Oxidizing agent Type | Equilibrium potential $\xi_h$/m V | Maximum exchange current density kA/m$^2$ ($\xi_h$ = O mv) |
|---|---|---|---|
| UNTREATED | $O_2$ | 680 | 0.05 |
| Anodically oxidized but not doped | $O_2$ | 900 | 0.5–0.8 |
| Doped but not anodically oxidized | $O_2$ | 880 | 3 |

If the anodically oxidized and doped carbon granules are employed in a filter bed operated with oxygen-saturated outflow from a treatment plant, the following mean values for reduction in the COD content and the TOC content during a residence time of 10 minutes are obtained for a period of operation of 5 months.

| TOC content in the feed mg/l | TOC content in the outflow mg/l | COD in the feed mg/l | COD in the outflow mg/l |
|---|---|---|---|
| 70 | 12 | 180 | 40 |

The content of chlorohydrocarbon (chloroform), which is ~0.3 mg/l in the feed, is reduced to <0.01 mg/l.

EXAMPLE 2

Graphite granules having a particle size of from 2 to 4 mm are subjected to anodic oxidation as described in Example 1. The oxidized granules are then washed with water and impregnated with a solution which contains 5% by weight of sodium vanadate. The impregnated graphite is then aged for about 1 hour at +25° C. and immersed in 5% strength by weight aqueous zirconium sulfate solution at pH 1 for 5 minutes. After this impregnation, the graphite is washed with water and then with a little 0.5% strength by weight sulfuric acid.

In the 5% strength sulfuric acid, the resulting equilibrium potential during gassing with oxygen is 1100 mV, and the maximum exchange current density with cathodic polarization is 8 kA/m$^2$ at a potential $\epsilon_h$ of 0 mV. In the outflow from a treatment plant, the catalyst gives similar degradation data to the catalyst of Example 1. This catalyst is preferably used for the oxidation of nitrite-containing and chlorohydrocarbon-containing waste waters.

EXAMPLE 3

Active carbon granules having a length of 5 mm and a diameter of 3 mm are applied onto a platinum electrode in 50% strength by weight nitric acid to give a 5 mm thick layer and subjected to anodic oxidation for 5 minutes at a current density of 6 kA/m$^2$ (based on the platinum surface). The potential $\epsilon_h$ of the granules at the end of the reaction is 2.1 V. When the oxidation is complete, the granules are washed with water and impregnated with 5% strength sodium vanadate solution.

The impregnated granules are then immersed in 7.5% strength by weight aqueous titanium (III) chloride solution at pH 1 for about 3 minutes, the solution is separated off and the granules are then aged for 2 hours at room temperature. When the catalyst is used in 5% strength aqueous sulfuric acid and gassed with oxygen, the resulting equilibrium potential $\epsilon_h$ is 1200 mV, and the maximum exchange current density with cathodic polarization and at a potential $\epsilon_h$ of 0 mV is 10 kA/m$^2$. For operation in a filter bed as in Example 1, using outflow from a treatment plant, a residual TOC content of ~10 mg/l and a residual COD content of ~30 mg/l are obtained. The catalyst is also suitable for the oxidation of sulfite-containing wastewaters.

EXAMPLE 4

Ten graphite tubes having a length of 500 mm, an internal diameter of 60 mm and an external diameter of 80 mm and possessing an open porosity of 16% are subjected to anodic oxidation on the outside in 50% strength by weight aqueous nitric acid at a current density of 2 kA/m$^2$ and a potential $\epsilon_h$ of 1.95 V for about 10 minutes. Thereafter, after, the tubes are activated as described in Example 3 and installed vertically in a cylindrical vessel so that the tube axes are about 100 mm apart. Air is forced through the inner bore of the tubes, while the outer surfaces are surrounded by waste-water. The air pressure inside the tubes is chosen so that the air just passes through the tube walls. This arrangement is preferably used for the treatment of highly contaminated wastewaters, for example wastewaters from dumps.

EXAMPLE 5

Graphite granules having a particle size of from 2 to 4 mm are poured onto a platinum electrode in 50% strength by weight nitric acid to form a layer about 4 mm high, and are subjected to anodic oxidation for 25 minutes at a current density of 6 kA/m$^2$ (based on the platinum surface). The potential $\epsilon_h$ of the graphite particles is about +1.98 V.

When the oxidation is complete, the oxidized granules are washed with water and impregnated with a 5% strength by weight aqueous sodium molybdate solution. Thereafter, the sample is heated at +80° C. for about 2 hours and then immersed for about 3 minutes in 0.5% strength sulfuric acid, the sulfuric acid is separated off and the said granules are then aged for 2 hours at room temperature. After this process, the sample is washed with water, moistened for about 1 minutes with 0.5% strength potassium sulfide solution and then freed from residual sulfur with wash water at pH 1, which is obtained using $H_2SO_4$.

When the catalyst is used in 5% strength aqueous sulfuric acid, an equilibrium potential of 1080 mV is established in the presence of oxygen. The maximum oxygen exchange current density on gassing with oxygen with cathodic polarization is ~8 kA/m$^2$ of geometrical surface area of the granules at a potential $\epsilon_h$ of 0 mV. The catalyst is preferably used for the oxidation of harmful substances in neutral and acidic wastewaters.

EXAMPLE 6

Graphite granules having a particle size of 3 mm are subjected to anodic oxidation and doped with molybdate, these steps being carried out as described in Example 5, after which the granules are employed in the electrolytes listed below, the following potentials and exchange current densities being obtained when hydrogen peroxide is used as the oxidizing agent.

| Electrolyte (oxidizing agent) Water with | Equilibrium potential $\xi_h$/mV | Maximum exchange current density (with cathodic polarization) kA/m$^2$ |
|---|---|---|
| 1% of $Fe(NO_3)_3$ + 1% of $H_2O_2$, pH = O | 1250 | >12 |
| 1% of $FeCl_3$ +- | 990 | 10 |

-continued

| Electrolyte (oxidizing agent) Water with | Equilibrium potential $\xi_h$/mV | Maximum exchange current density (with cathodic polarization) kA/m$^2$ |
|---|---|---|
| 1% of $H_2O_2$, pH = O | | |
| 1% of $Fe_2(SO_4)_3$ + 1% of $H_2O_2$, pH = O | 950 | ~10 |

The $Fe(NO_3)_3/H_2O_2$ system proves to be the most advantageous oxidizing agent. Using this oxidizing agent in an excess of 1.5 times the stoichiometric amount, it is possible to achieve virtually complete degradation of chlorohydrocarbons, eg. chloroacetone, chloral, chloroacetal, chloroform, chloroacetic acid and o-chloropyridine, during only a short residence time (~10 minutes).

EXAMPLE 7

Graphite plates are subjected to anodic oxidation for different times in 50% strength by weight aqueous nitric acid at a current density of 2 kA/m$^2$ and at +30° C. The samples are washed with distilled water and degassed for 12 hours under $3.10^{-8}$ mbar. Thereafter, an ESCA surface analysis is carried out, the surface being analyzed for oxygen, carbon and C-C bonds. The values listed below are based on a maximum depth of about 4.2-6.8 nm.

| Oxidation time minutes | Concentration of $O_2$ atom % | Concentration of C atom % | Content of C—C bonds atom % | Graphite potential $\xi_h$ V |
|---|---|---|---|---|
| 0.5 | 87 | 18 | 58 | 1.5 |
| 1 | 82 | 21 | 48 | 1.96 |
| 2 | 77 | 25 | 40 | 1.97 |
| 3 | 74 | 27 | 34 | 1.96 |
| 4 | 72 | 28 | 30 | 1.96 |
| 5 | 70.5 | 29 | 26 | 1.96 |
| 10 | 70.5 | 29 | 24 | 1.97 |
| 15 | 70.5 | 29 | 24 | 1.97 |

This table shows that the anodic oxidation of the graphite reaches a steady state after only 5 minutes. Investigations into graphites which had been preoxidized for various times and doped with molybdenum(VI) compounds showed that the catalytic activity decreased substantially for oxidation times of <5 minutes.

EXAMPLE 8

Graphite granules having particle size of 3 mm are subjected to anodic oxidation as described in Example 5 and then reduced cathodically in 5% strength aqueous sulfuric acid at a current density of 1 kA/m$^2$ for about 10 minutes.

The granules are employed in a filter bed as described in Example 1, and inoculated with microorganisms of the Nitrobacter nitrosomonas type. On operation with outflow from a treatment plant, the following values for the COD content, the TOC content and ammonium degradation are found:

| TOC content Feed mg/l | TOC content Outflow mg/l | COD Feed mg/l | COD Outflow mg/l | $NH_4^+$ content Feed mg/l | $NH_4^+$ content Outflow mg/l |
|---|---|---|---|---|---|
| 70 | 25 | 180 | 65 | 120 | 1 |

We claim:

1. A process for the oxidative treatment of a wastewater whereby said wastewater is passed through filter beds containing a carbon-containing catalyst and an oxidizing agent, wherein the carbon-containing catalyst is formed by subjecting a carbon carrier to anodic oxidation in an aqueous mineral acid at a potential $\epsilon_h$ of from about +1.3 to +10 V and then doped with one or more compounds selected from the group consisting of molybdenum-(VI), tungsten (VI) and vanadium.

2. The process of claim 1, wherein the carbon carrier used is graphite, coke or active carbon.

3. The process of claim 1, wherein the anodic oxidation is carried out in aqueous nitric acid at a potential $\epsilon_h$ of from +1.8 to +2.5 V.

4. The process of claim 1, wherein doping of the carbon carrier is effected using one or more solutions selected from the group consisting of aqueous alkali metal molybdate, tungstate or vanadate solutions.

5. The process of claim 1, wherein, in addition to doping with said compounds, a treatment with an aqueous alkali metal sulfide or ammonium sulfide solution is carried out.

6. The process of claim 1, wherein the carbon carrier which has been subjected to partial anodic oxidation is doped with molybdenum(VI) and iron(III) compounds and partially reduced with an aqueous hydrazine hydrate solution.

7. The process of claim 1, wherein the carbon carrier which has been subjected to partial anodic oxidation is also doped with an iodine(VII) or iodine(V) or tellurium(VI) compound, the atomic ratio of molybdenum or tungsten or vanadium to iodine or tellurium being 6:1.

8. The process of claim 1, wherein the partially oxidized carbon carrier is doped with vanadium(V) compounds and titanium and one or more compounds selected from the group consisting of zirconium(III) or zirconium(IV) compounds, the ratio of vanadium to titanium and zirconium being from 1:1 to 2:1.

9. A process as claimed in claim 1, wherein the partially oxidized carbon carrier which is doped with said compounds additionally contains iron, cobalt or nickel in the form of their divalent oxides, oxide hydroxides or hydroxides.

10. The process of claim 9, wherein the carbon carrier is further doped with an element of sub-group 4 in the form of its trivalent or tetravalent oxide or oxide hydroxide.

11. The process of claim 1, wherein an iron(III) nitrate/hydrogen peroxide mixture is used as the oxidizing agent.

12. The process of claim 1, wherein the carbon carrier contains added anionic polyelectrolytes.

13. Th process of claim 12, wherein the carbon carrier also contains added cationic polyelectrolytes.

14. The process of claim 1, wherein the carbon carrier is further doped with an element of sub-group 4 in the form of its trivalent or tetravalent oxide or oxide hydroxide.

15. The process of claim 14, wherein said elements of sub-group 4 are zirconium or titanium.

16. The process of claim 1, wherein the carbon carrier contains added cationic polyelectrolytes.

* * * * *